No. 864,539. PATENTED AUG. 27, 1907.
A. E. HORTON.
INSECT TRAP AND TREE GUARD.
APPLICATION FILED JAN. 15, 1906.
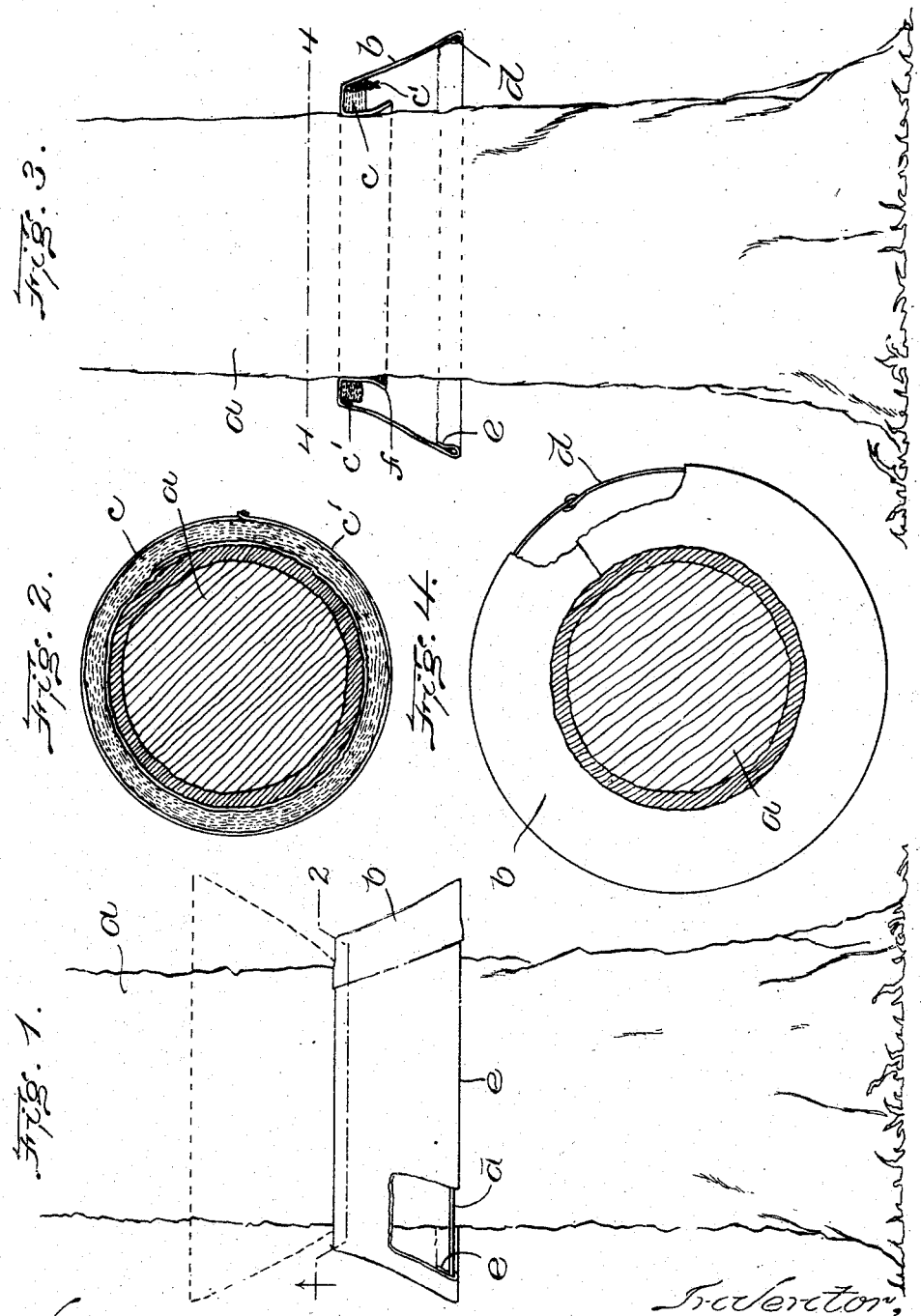

UNITED STATES PATENT OFFICE.

ARTHUR E. HORTON, OF LEXINGTON, MASSACHUSETTS.

INSECT-TRAP AND TREE-GUARD.

No. 864,539.     Specification of Letters Patent.     Patented Aug. 27, 1907.

Application filed January 15, 1906. Serial No. 296,029.

*To all whom it may concern:*

Be it known that I, ARTHUR E. HORTON, of Lexington, in the county of Middlesex and State of Massachusetts, have invented certain new and useful Improvements in Insect-Traps and Tree-Guards, of which the following is a specification.

The object of this invention is to provide a simple device for protecting trees from the ravages of insects, particularly of the caterpillars of the gypsy and brown-tail moth species.

The device is designed to be particularly effective by providing a double guard and at the same time is inexpensive.

The device is constructed as hereinafter described and illustrated in the drawings, in which,—

Figure 1 represents an elevation of my improved guard and trap in position upon a tree. Fig. 2 represents a cross-section of the guard and tree on line 2—2 of Fig. 1. Fig. 3 represents a sectional view of the trap and guard in place upon a tree. Fig. 4 represents a sectional view on line 4—4 of Fig. 3, showing the trap and guard in plan.

The same reference characters indicate the same parts in all the figures.

The tree trunk is represented by $a$ to which is applied my improved insect trap and tree guard which consists of a strip or band of flexible material $b$, such as cloth, preferably burlap. The strip is carried around the tree and secured thereto intermediate its edges, a ring or band $c$ being carried about the strip and furnishing the securing means. This band may be of any material desired, such as felt, rope or string, wood or metal, and may have any desired shape in cross-section. It may also be secured to the tree in any desired manner, as by nailing, tying, etc., the preferred way being by passing a ligature $c'$ of wire around the band and fastening the ends of the ligature by twisting them together. By twisting the ends of the wire sufficiently, any desired amount of tension may be given the ligature, and the band will thereby be pressed into tight engagement with the tree at all points, no open places being left to permit passage of an insect. After the band $c$ has been secured to the tree and thereby the strip $b$ fastened in place, the portion of the strip above the band represented in Fig. 1, is allowed to fall, whereby it is carried about the upper and outer sides of the band or ring $c$ and is allowed to hang freely therefrom, as illustrated in full lines in Fig. 1 and in Fig. 3. Preferably the strip $b$ or at least the edges thereof, is of greater length than the circumference of the tree, the intermediate portion which is secured to the tree being gathered or cut so that it will fit closely around the tree. This permits the depending portion of the protector to flare outwardly and it is held in such flaring position and separated from the tree on all sides by a hoop $d$ which is secured to the edge $e$ of the strip. The hoop is of greater diameter and circumference than the tree and therefore when secured to the edge of the strip at all points, it holds the latter away from the tree and at the same time weights it down so that it cannot readily fly upward above the band $c$. The other edge $f$ of the strip $b$ is also allowed to hang freely adjacent the tree trunk and is held separated therefrom by the stiffness of the material. If desired, a second hoop or stiffening wire may be applied to this edge also to hold it away from the tree, but this is not ordinarily necessary. The doubled edge, or zone about which the securing and distending band extends, divides the strip into two breadths, of which the first or inner breadth immediately surrounds the tree, and is itself surrounded by the band $c$ and ligature $c'$, while the second or outer breadth surrounds all the other parts and is distended at its lower edge by the hoop.

Preferably the band $c$ will be saturated with an insecticide or smeared on its under surface with some sticky substance. A porous substance such as felt or rope is the best material to be used for the band when poison or sticky material is to be used, as then the poison or sticky cement will be more or less absorbed by the pores of the band and will be preserved in better condition.

In applying the protector to the tree it will preferably be held surrounding the tree with the hoop or wire $d$ uppermost and the edge $f$ hanging freely. The band $c$ will then be applied, whereupon the upper edge $e$ may be dropped and it will take the position illustrated. Instead of this, however, the edge $f$ may be held uppermost and after the protector has been secured, it may be allowed to fall in a similar manner over the ring and outside of the main portion of the strip, but the preferred manner of attaching is that illustrated and first described. In either case, however, the strip will be folded or doubled upon itself intermediate its edges and there will be included within the fold a band or ring which is secured to the tree and supports the strip $b$.

Both of the edges of the strip serve to arrest and entrap the insects for ordinarily the edge $f$ will be separated so much from the tree that the insects cannot climb directly upon it. In attempting to crawl around the edge $f$, many of the bugs will fall off and those that do not will either be caught by the sticky substance or poisoned by the insecticide or entrapped by the main portion of the band. Gasolene, paris green solution, or some other liquid fatal to insect life may be sprinkled upon the outside of the trap, and the insects caught therein killed by the liquid soaking through the burlap or other porous material of which the strip $b$ is made.

It will be seen that I have provided a simple device of very few parts, which is very efficient for its purpose and inexpensive to make.

I claim:—

1. An insect trap for trees comprising a flexible fabric strip bent into annular form and doubled at one edge, a securing ligature between the plies of said folded edge, passing around the tree trunk and inner ply of the strip, and a hoop secured to the other edge.

2. An insect trap and tree guard comprising a breadth of flexible material for surrounding a tree and having a freely hanging edge, a ring surrounding the upper part of said flexible breadth, a second breadth of flexible material surrounding and supported by said ring, its lower edge hanging therefrom, and a hoop of greater diameter than the tree secured at all points to said lower edge for distending the same.

3. An insect trap and tree guard comprising a strip of flexible material folded lengthwise and bent into annular form, a ring or band intermediate the plies of the folded strip and adapted to be secured to the tree, supporting the strip and permitting both edges to hang freely, and a hoop secured to the edge of the outermost ply for distending the latter.

4. An insect trap and tree guard comprising a strip of flexible material adapted to surround a tree, a band surrounding the strip between the edges thereof, and a hoop secured to one of the edges of the strip, one portion of the strip being permitted to fall over the band outside the band and the other portion.

5. An insect trap and tree guard consisting of a strip of flexible material in annular form and doubled into two plies, a porous band or ring contained between the plies and having on its under side a coating of sticky or poisonous material, and a stiff band or hoop secured to the edge of one of the plies.

In testimony whereof I have affixed my signature, in presence of two witnesses.

ARTHUR E. HORTON.

Witnesses:
 ELIZA M. SIMONDS,
 CLIFFORD SAVILLE.